United States Patent
Jourdan et al.

(10) Patent No.: US 7,457,938 B2
(45) Date of Patent: *Nov. 25, 2008

(54) STAGGERED EXECUTION STACK FOR VECTOR PROCESSING

(75) Inventors: Stephan Jourdan, Portland, OR (US); Avinash Sodani, Hillsboro, OR (US); Michael Fetterman, Cambourne (GB); Per Hammarlund, Hillsboro, OR (US); Ronak Singhal, Portland, OR (US); Glenn Hinton, Portland, OR (US)

(73) Assignee: Intel Corporation, Santa Clara, CA (US)

(*) Notice: Subject to any disclaimer, the term of this patent is extended or adjusted under 35 U.S.C. 154(b) by 241 days.

This patent is subject to a terminal disclaimer.

(21) Appl. No.: 11/240,982

(22) Filed: Sep. 30, 2005

(65) Prior Publication Data

US 2007/0079179 A1  Apr. 5, 2007

(51) Int. Cl.
*G06F 19/00* (2006.01)
*G06F 15/00* (2006.01)
*G06F 17/00* (2006.01)

(52) U.S. Cl. ............... 712/2; 712/3; 712/7; 712/20; 712/32; 712/215

(58) Field of Classification Search ............... 712/3, 712/4, 7, 12, 20, 222; 718/100; 345/502
See application file for complete search history.

(56) References Cited

U.S. PATENT DOCUMENTS

| | | | | |
|---|---|---|---|---|
| 5,073,970 A | * | 12/1991 | Aoyama et al. ............... | 712/7 |
| 5,423,051 A | * | 6/1995 | Fuller et al. ................... | 712/7 |
| 5,530,881 A | * | 6/1996 | Inagami et al. ................ | 712/7 |
| 5,951,670 A | | 9/1999 | Glew et al. ................... | 712/23 |
| 5,978,900 A | | 11/1999 | Liu et al. .................... | 712/216 |
| 6,233,671 B1 | * | 5/2001 | Abdallah et al. ............. | 712/221 |
| 6,505,293 B1 | | 1/2003 | Jourdan et al. ............. | 712/217 |
| 6,516,406 B1 | | 2/2003 | Peleg et al. ................. | 712/225 |
| 6,553,483 B1 | | 4/2003 | Jourdan et al. ............. | 712/217 |
| 6,591,359 B1 | | 7/2003 | Hass et al. .................. | 712/217 |
| 6,625,723 B1 | | 9/2003 | Jourday et al. ............. | 712/217 |
| 6,694,426 B2 | * | 2/2004 | Roussel et al. ............. | 712/221 |
| 6,839,828 B2 | * | 1/2005 | Gschwind et al. ............. | 712/20 |
| 2004/0064681 A1 | | 4/2004 | Jourdan et al. ............. | 712/225 |
| 2005/0125636 A1 | * | 6/2005 | Ford et al. .................. | 712/221 |

OTHER PUBLICATIONS

Hennessy et al. Computer Architecture, p. G-10, lines 12-22.*
Hinton, et al., "The Microarchitecture of the Pentium® 4 Processor". Intel Technology Journal Q1, 2001.
Espasa, et al. "Tarantula: A Vector Extension to the Alpha Architecture". ACM Sigarch Computer Architecture News, vol. 30, Issue 2 (May 2002). pp. 281-292. (2002).

* cited by examiner

*Primary Examiner*—Henry Tsai
*Assistant Examiner*—Cheng-Yuan Tseng
(74) *Attorney, Agent, or Firm*—Trop, Pruner & Hu, P.C.

(57) ABSTRACT

In one embodiment, the present invention includes a method for executing an operation on low order portions of first and second source operands using a first execution stack of a processor and executing the operation on high order portions of the first and second source operands using a second execution stack of the processor, where the operation in the second execution stack is staggered by one or more cycles from the operation in the first execution stack. Other embodiments are described and claimed.

24 Claims, 5 Drawing Sheets

STAGGERED EXECUTION STACK FOR VECTOR PROCESSING

BACKGROUND

Embodiments of the present invention relate to data processing, and more particularly to processing of vector data.

Many processors have an architecture that readily supports execution of scalar instructions on scalar data. In other words, these architectures typically execute instructions to perform an operation on single data elements at a given time. In contrast, a vector processor can execute operations on multiple data elements simultaneously.

Most modern microprocessors are generally of a scalar-based architecture, although many such processors implement extensions to perform certain vector processing, commonly referred to as single instruction multiple data (SIMD) instructions. However, these processors are generally not designed to handle very wide data paths. Accordingly, SIMD instruction execution is limited to the standard data width of the data path of a processor, which is often 64 or 128 bits wide. In contrast, vector processors typically can handle vector operations on wider data paths.

Some processors include both scalar processor units and vector processor units. Typically these processor units are completely independent, and thus act as separate processors or co-processors. Accordingly, each processor consumes significant real estate, power and processing bandwidth.

Accordingly, a need exists for improved vector execution, while avoiding the impact of a full vector processor.

DETAILED DESCRIPTION

In various embodiments, a scalar processor may be enhanced with at least portions of a vector data path to provide for improved handling of vector operations. In such manner, the processor can handle operations on data wider than the scalar data path of the processor to achieve improved performance. Furthermore, in various implementations rather than incorporating a full vector processor, only a limited portion of a vector pipeline may be added to a scalar processor, thus reducing size requirements and power consumption. For example, in some implementations an additional data path or execution stack may be included in a processor to handle execution of instructions for data lengths wider than a width of the scalar data path. In such an implementation, control for the vector data path may be handled via control stages of the scalar processor. In such manner, the vector data path acts as a slave to the scalar data path. To ease implementation, execution of instructions in the vector data path may be staggered by a predetermined number of cycles from their execution in the scalar data path, as will be described further below.

Figure 1:
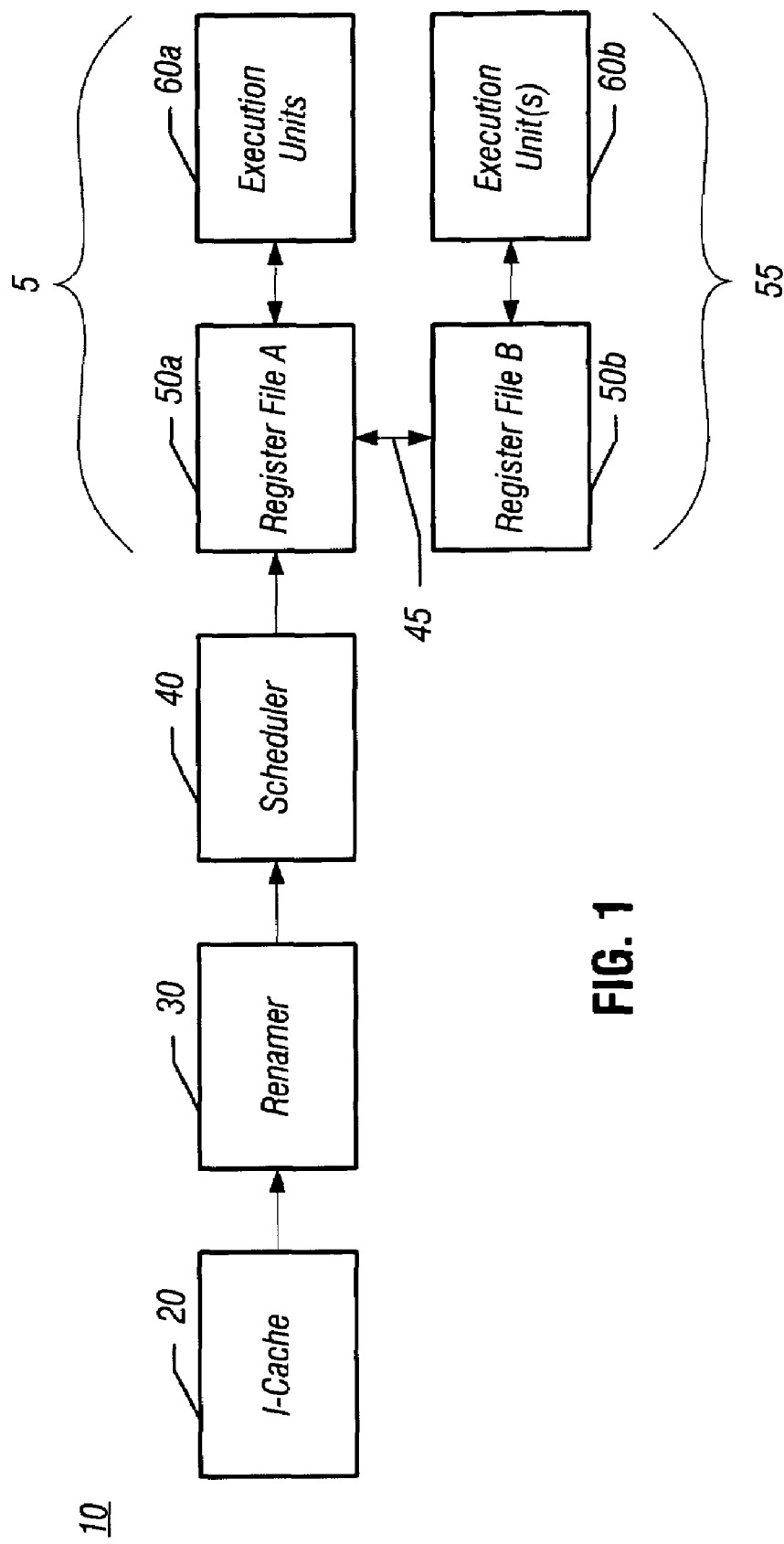
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may include a multi-stage processor pipeline. In the embodiment shown in FIG. 1, processor 10 is a five-stage processor, although the scope of the present invention is not so limited. Furthermore, it is to be understood that the representation shown in FIG. 1 is intended for ease of discussion and in various embodiments many more stages or differently named stages may exist in a given processor.

Still referring to FIG. 1, processor 10 includes an instruction cache (I-cache) 20 that provides temporary storage for instructions to be executed. From I-cache 20, instructions may be provided to a renamer 30, which may be used to parse instruction bytes into instructions and decode any prefixes. Furthermore, renamer 30 may decode instructions into micro-operations (μops) and also rename references to registers within the μops from logical registers to physical registers (e.g., of a register file). The renamed instructions may then be provided to a scheduler 40, which may obtain the necessary data for the instruction (e.g., source operands) and provide them to a first execution stack or data path 5, which may be formed of a first register file (register file A) 50a and a plurality of first execution units 60a. While not limited in this regard, in one embodiment, these resources may have a data width of 128 bits. The source data may be obtained from a memory hierarchy coupled to processor 10, not shown in the embodiment of FIG. 1.

When all needed data for a μop is present in first register file 50a, the μop may be executed via one of first execution units 60a. In various implementations different execution units may be present. For example, integer, floating point, address generation, single instruction multiple data (SIMD), and store data (STD) units may be present, although the scope of the present invention is not so limited. After execution, result data may be provided back to first register file 50a for storage until the instruction retires. Then, the result data may be written back to a desired location (e.g., of a memory hierarchy).

While shown with this implementation in the embodiment of FIG. 1, many variations are possible. For example, a write back stage may be coupled to first execution units 60a to receive result data for later delivery to the memory hierarchy. Alternately, one or more other buffers such as store buffers, load buffers and the like may be coupled to first register file 50a. As one example, one or more retirement buffers may be coupled to first register file 50a for storage of μops and associated result data until retirement of the associated instruction. Thus the five-stage pipeline shown in FIG. 1 may provide for execution of instructions, particularly scalar instructions.

In various embodiments, enhanced performance for execution of instructions manipulating data having a width wider than resources available in first register file 50a and first execution units 60a may be achieved by adding redundant data path members in processor 10. Accordingly, as shown in FIG. 1 a second execution stack or data path 55 formed of a second register file (register file B) 50b and one or more second execution units 60b may be present. Throughout the discussion, data path 5 may be referred to as a main data path or a scalar data path, while data path 55 may be referred to as an auxiliary data path or a vector data path. In some embodiments, this additional data path may provide support for execution of vector instructions. As used herein, the term vector instruction refers to an instruction that is to operate on at least one source operand of a vector nature. That is, at least one of the source operands for the instruction is a datum formed of multiple data elements. As one example, embodiments of the present invention may provide for execution of instructions having vector lengths greater than 128 bits, e.g., corresponding to the width of registers within first register file 50a, and up to vector lengths of 512 bits, although other implementations are possible.

Still referring to FIG. 1, second register file 50b may be coupled to first register file 50a by one or more buses 45 or other interconnects. As described further below, multiple interconnects may be coupled from scalar data path 5 to vector data path 55 and vice versa. Using such interconnects, control information and data to be used by vector data path 55 may be received. Accordingly, control over vector data path 55 is handled by scalar data path 5. In this manner, a minimum amount of space and power consumption to enable execution of larger vectors may be used, while providing for effective control of vector data path 55 as a slave to scalar data path 5.

Figure 2:
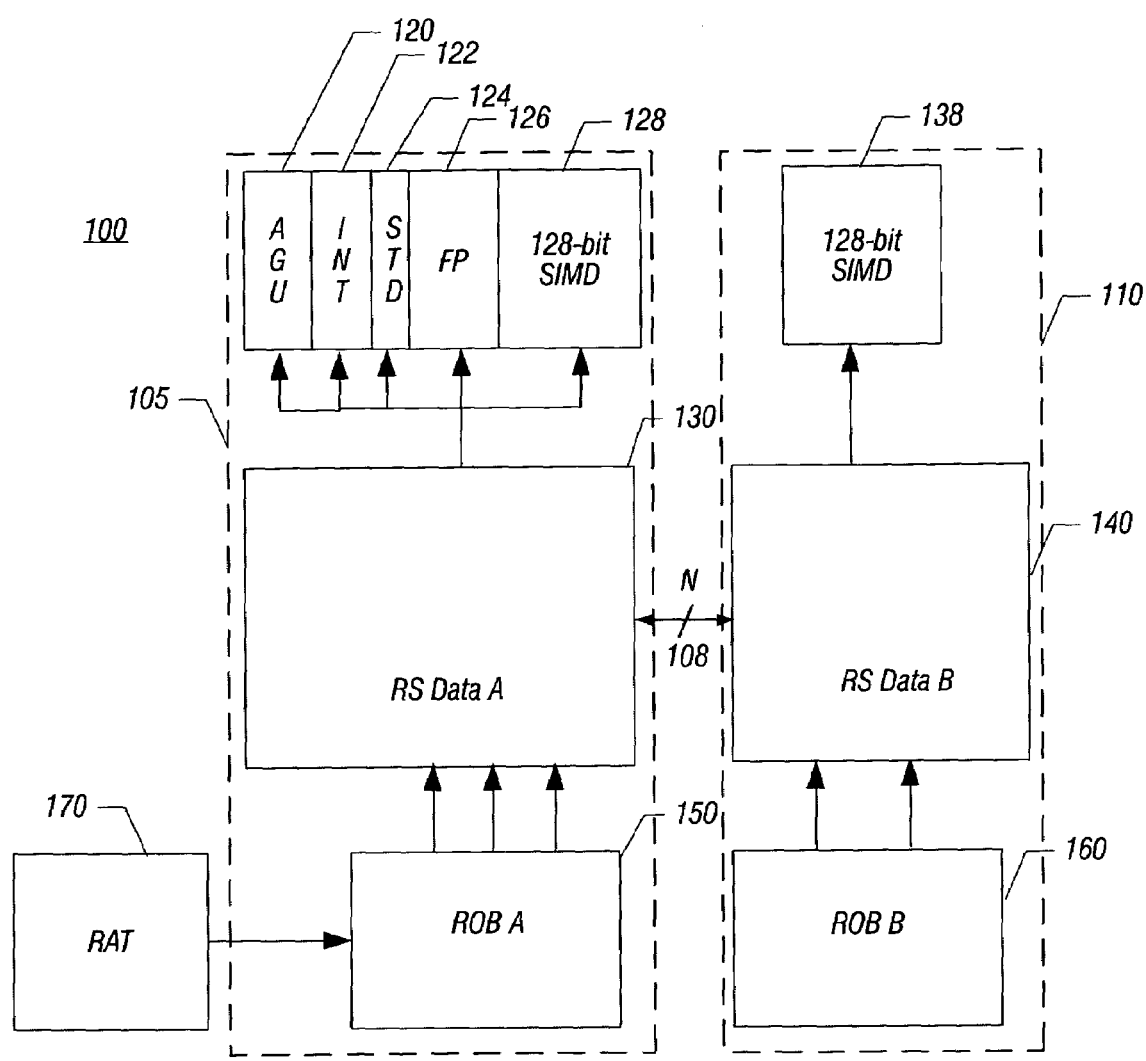
FIG. 2 is a block diagram of a processor in accordance with another embodiment of the present invention.

Of course, a processor may take many different forms depending on a desired architecture. Referring now to FIG. 2, shown is a block diagram of a processor in accordance with another embodiment of the present invention. As shown in FIG. 2, processor 100 includes a first data path 105 and a second data path 110. In many implementations, first data path 105 may correspond to the data path of a scalar processor, while second data path 110 may be an auxiliary data path (e.g., a vector data path) controlled by the same front-end control stages that control first data path 105.

Specifically as shown in FIG. 2, the control stages may include a register alias table (RAT) 170, which may receive decoded instructions from a front end of the processor (not shown in FIG. 2). RAT 170 may be used to receive μops from the front end and rename the μops for the resources of the data paths. For first data path 105, the renamed μops may then be provided to a reorder buffer (ROB) (i.e., ROB A) 150. ROB 150 may act as a register file to store μops and corresponding source operands until the μop is ready for passing to a reservation station (RS) (i.e., RS data A) 130. Similarly, ROB 150 may also store corresponding results of μops that have already executed. These results may be held in ROB 150 until the μops are retired (at which point the ROB entry is freed). Since results are stored here, dependent μops may read ROB 150 for their source data if the source data are ready. However, the lifetime of an entry in ROB 150 is from when the corresponding μop is allocated to when it is retired. If a μop's source data is not available in ROB 150, then the μop may wait in RS 130 until the source data becomes ready.

Thus RS 130 may be used to store μops until their corresponding source operands are present and/or until the μop is ready for execution in one of a plurality of execution units of first data path 105. Reservation station 130 may include a plurality of dispatch ports to couple instructions and data to selected ones of execution units of first data path 105. In some embodiments, multiple dispatch ports may be used in each cycle.

As shown in FIG. 2, the execution units in first data path 105 include an address generation unit (AGU) 120, an integer (INT) execution unit 122, a store data (STD) unit 124, a floating point (FP) execution unit 126, and a SIMD execution unit 128. While shown in the embodiment of FIG. 2 as being a 128-bit execution unit, it is to be understood that SIMD unit 128 may be different widths in other embodiments. After execution of a μop in one of the execution units, result data may be passed back to RS 130 for storage, e.g., until retirement. While not shown in FIG. 2, it is to be understood that additional buffers and other resources may be present within processor 100.

Still referring to FIG. 2, vector data path 110 may include similar components to scalar data path 105. Specifically, vector data path 110 may include a ROB (i.e., ROB B) 160. While not shown for ease of illustration, RAT 170 may be coupled to ROB 160 to provide renamed μops to ROB 160. Furthermore, a reservation station (i.e., RS data B) 140 is present and may be coupled to an execution unit 138, specifically a SIMD execution unit which, in one embodiment, may be a 128-bit execution unit. However, in other implementations additional execution units may be present and furthermore, may have a wider data width.

As will be described in greater detail below, execution of instructions in vector data path 110 may be staggered by one or more cycles. In such manner, easier control and communication between the data paths may be effected. For example, transmission of control information from RAT 170 to ROB 160 may be staggered from transmission of the same control information from RAT 170 to ROB 160 by one or more cycles.

As further shown in FIG. 2, a plurality of buses 108 may couple first data path 105 and second data path 110. More specifically, multiple data paths may be used to provide data from first data path 105 to second data path 110 and vice versa. Furthermore, dedicated control buses may be used to provide control signals from first data path 105, and more specifically from the control stages for first data path 105 to second data path 110.

In one implementation, at least two data buses having a width equal to the data width of the data paths (e.g., 128 bits) may be present to provide results of load operations from first data path 105 to second data path 110, although other numbers of buses are possible. Further, the number of buses may be dependent on a number of simultaneous load operations that can be dispatched from RS 130 to RS 140. To effect these interconnections, existing load result buses may be extended to provide support to auxiliary data path 110. Furthermore, another data bus having, e.g., a 128-bit width may provide store data from auxiliary data path 110 to main data path 105, as a store buffer (not shown in FIG. 2) which stores result data prior to retirement of an instruction may only be present in main data path 105. This bus may also provide for transfer of data from auxiliary data path 110 to main data path 105 during scatter/gather operations. Still further, an additional bus, e.g., also 128 bits wide may be provided from main data path 105 to auxiliary data path 110 to provide support for certain instructions, e.g., a scalar to vector data copy operation. While described in this particular implementation as having these different data buses, it is to be understood that the scope of the present invention is not so limited and other communication paths between a main data path 105 and auxiliary data path 110 may exist.

In various implementations, memory operations (e.g., load and store operations) may be executed on the main data path only to reduce complexity and duplication of circuitry. Accordingly, result data to be stored or operand data to be loaded may be communicated between the main data path and the auxiliary data path. For example, with reference back to FIG. 2, AGU unit 120 and STD unit 124 may be used to implement memory operations for the data of both the main path and the auxiliary data path. Thus in various embodiments, memory operations, such as stores may be performed using the execution units of main data path 105 only. As an example, to store data from a vector operation to memory, AGU 120 and STD unit 124 may first perform the store on the data from reservation station 130 of scalar data path 105, and then perform the store on data from reservation station 140 of vector data path 110.

Figure 3:
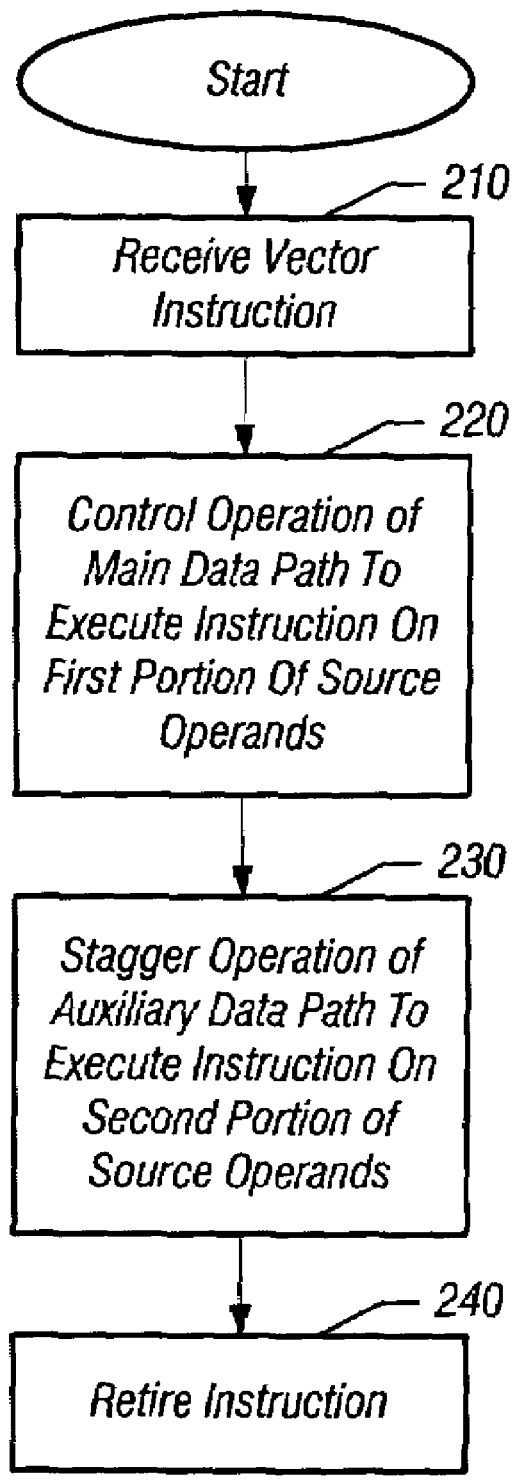
FIG. 3 is a flow diagram of a method in accordance with an embodiment of the present invention.

Referring now to FIG. 3, shown is a flow diagram of a method in accordance with one embodiment of the present invention. Specifically, as shown in FIG. 3 method 200 may be used to execute vector instructions using a processor in accordance with an embodiment of the present invention. Method 200 may begin by receiving a vector instruction (block 210). For example, a processor front end may provide an instruction to perform an operation on vector data. Based on this instruction, one or more control stages of the processor may control operation of a main data path to execute the instruction on a first portion of source operands (block 220). For example, a first portion of the operands (e.g., a least significant bits (LSB's) portion) may be manipulated in the first data path. Accordingly, the data available in the main register file may be provided to a selected execution unit, e.g., a SIMD execution unit for performing the vector operation, which may be any desired operation possible using the selected execution unit.

Still referring to FIG. 3, next operation of the auxiliary data path may be staggered (block 230). More specifically, the auxiliary data path may be controlled by the same main path control stage(s) to execute the same vector instruction on another portion of the source operands. For example, a most significant bits (MSB's) portion of the data may be provided to an auxiliary register file, and from there to the auxiliary execution unit which may also be a SIMD execution unit, for example. The latency of the stagger may vary in different embodiments to allow sufficient time to obtain the needed data and provide it to the auxiliary path. The results of both stages may be written back to a desired location, e.g., into the register file of the main data path for further use or later writeback to another portion of a memory hierarchy. When the instruction is thus completed (and any older dependent instructions completed), the instruction may be retired (block 240). While described with this particular implementation in the embodiment of FIG. 3, it is to be understood that many different methods of executing vector operations using a supplemental data path may be implemented.

As described above, in some embodiments the vector data path may be the same width as the main data path. For example, in one embodiment both data paths may have a width of 128 bits. However, some vector instructions may be used to execute on vector lengths even wider than the combined data path of 256 bits. For example, some vector instructions may execute on data having a width of 512 bits, although other implementations are possible.

Accordingly, in such implementations these vector instructions may be broken into separate portions, with each portion being executed, e.g., in a high and low fashion in both data paths. For example, for a vector instruction to operate on a data width of 512 bytes, the instruction may be broken into 256 bits such that first the operation is performed in both data paths on bits 0-255 of the vector data and then the same vector operation is performed on both data paths on bits 256-511 of the vector data. Of course, execution of each of the portions of the vector operation in the vector data path may be staggered from the main data path by a predetermined number of cycles to provide sufficient latency for transfer of control and data to and from the vector data path.

Thus any vector instruction that operates on vector lengths greater than the combined data path width may be broken up into different μops, with each μop operating on an associated portion of the data. As an example, an instruction to operate on 512-bit data can be broken into a low μop and a high μop. The low μop may be executed first on a corresponding 256 bits of data (e.g., low order bits in the main data path and high order bits in the vector data path as discussed above). The high μop may be executed on the high order 256 bits, with the low order portion being executed in the main data path and high order bits being executed in the vector data path, for example.

As discussed above, one operation that may be implemented in a processor in accordance with an embodiment of the present invention is a scalar to vector data copy operation. To implement such an operation, a dedicated μop may be provided. For example, a "duplicate" or "move" μop may read data from reservation station 130 of main data path 105 and copy it into reservation station 140 of auxiliary data path 110. This μop may be used, for example, in connection with adding a scalar value to a vector value. As an example, the duplicate μop may have a one cycle latency.

In contrast, a similar μop to move contents of a register in reservation station 140 in auxiliary data path 110 to reservation station 130 of main data path 105 may have a higher latency, as the pipelines are skewed by a predetermined number of cycles. As an example, in an implementation using a two-cycle latency, the duplication from auxiliary data path 110 to main data path 105 may have a three-cycle latency. Such a μop may also be used to perform a swap operation between the two data paths.

Such duplicate μops may be used to copy scalar values into both data paths for use in operations with vector register contents of the data paths. For example, the following pseudo-code in Table 1 may be used to perform an addition operation to add a scalar and vector.

TABLE 1

VADD VMM8, XMM4
TMP0 <- DUP XMM4 // XMM4 is 128 bits and is duplicated to form 256 bits
VMM8 <- VADD VMM8, TMP0 // broken into 2 uops: LO and HI Thus as shown in Table 1, to implement a vector addition operation one operand (i.e., stored in register XMM4) is copied from the main path to the scalar path and stored in a temporary register (TMP0). Then the addition is performed by adding the contents of a second register (VMM8) and the temporary register. This addition may be implemented by breaking the instruction into two μops, with each Lop executing on data in the data paths. The result may be obtained from the vector data path and provided to the register file of the scalar data path, in some implementations, for association with the result from the scalar data path.

Figure 4:
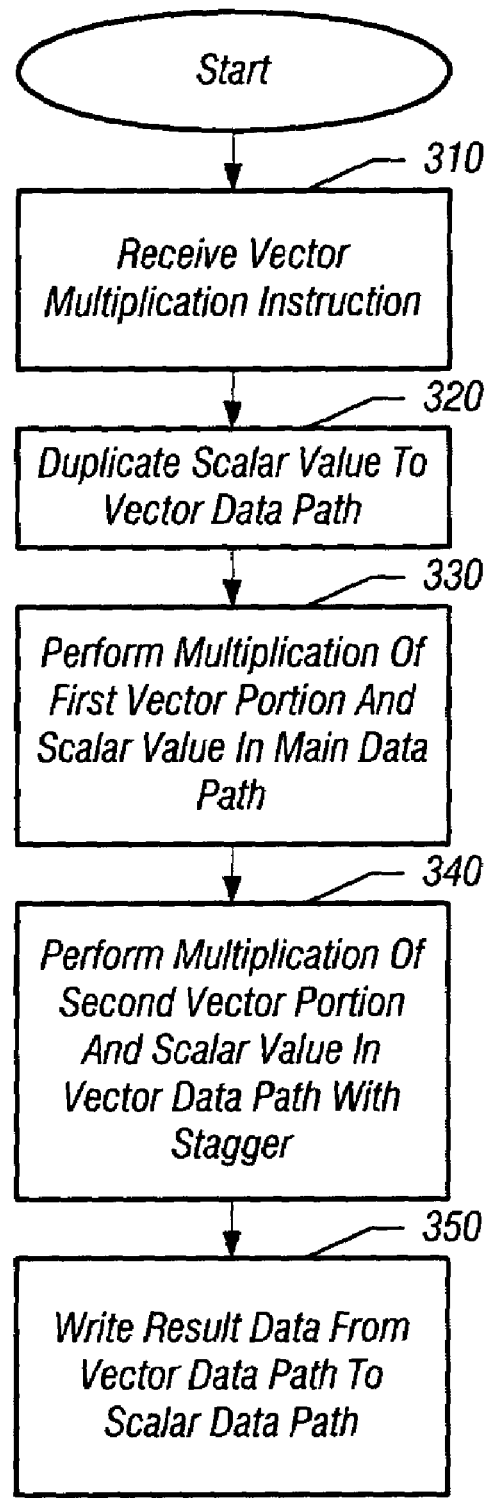
FIG. 4 is a flow diagram of a method of performing a vector operation in accordance with one embodiment of the present invention.

Referring now to FIG. 4, shown is a flow diagram of a method in accordance with one embodiment of the present invention. As shown in FIG. 4, method 300 may be used to perform a vector multiplication operation. Specifically, a vector multiplication instruction may be received, e.g., from a processor front end (block 310). A scalar value to be used in the multiplication may next be duplicated from the scalar data path to the vector data path (block 320). For example, a duplicate μop as discussed above may be used.

Next, multiplication of a first vector portion and the scalar value may be performed in the main data path (block 330). For example, low order bits of the vector data may be multiplied in an execution unit of the main data path. Next, a predetermined number of cycles later the staggered execution of the multiplication of a second vector portion and the scalar value may be performed in the vector data path. For example, the second vector portion may be the high order bits of the vector data. Then, the resulting product may be written from the vector data path to the scalar data path (block 350). While not shown in FIG. 4, the final product resulting from the staggered multiplication operation may be used as desired, for example, for further operations in the data paths or for writing back to a memory hierarchy. While described with this particular implementation in the embodiment of FIG. 4, it is to be understood that the scope of the present invention is not so limited and in other embodiments staggered execution of other instructions may be similarly or otherwise performed.

Thus in various implementations, a vector data path may act as a slave data path to the scalar data path. In other words the vector data path lacks any independent control mechanisms and instead it receives all control from the scalar processor control stages. In so doing, reduced complexity and power consumption is afforded. To further reduce power consumption, in many embodiments the vector data path may be controlled to be in a power down state during scalar operations. That is, when the vector data path is not needed for operations on larger data widths it is powered down, thus avoiding additional power consumption.

Figure 5:
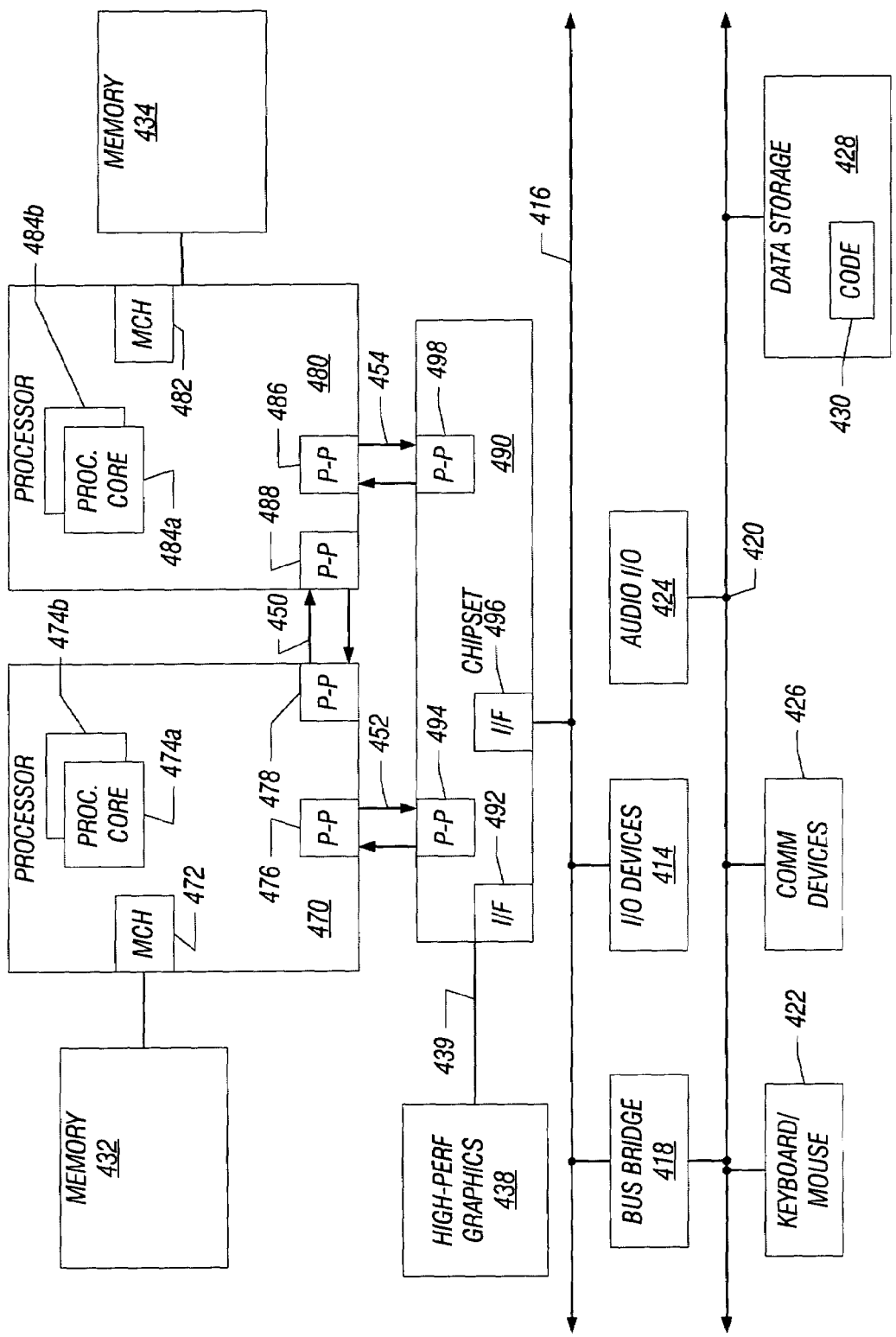
FIG. 5 is a block diagram of a system in accordance with another embodiment of the present invention.

Embodiments may be implemented in many different system types. Referring now to FIG. 5, shown is a block diagram of a processor system in accordance with an embodiment of the present invention. As shown in FIG. 5, the multiprocessor system is a point-to-point interconnect system, and includes a first processor 470 and a second processor 480 coupled via a point-to-point interconnect 450. As shown in FIG. 5, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may include auxiliary execution stacks to execute instructions staggered from the main execution stacks in accordance with an embodiment of the present invention. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 5, MCH's 472 and 482 couple the processors to respective memories, namely a memory 432 and a memory 434, which may be portions of main memory locally attached to the respective processors.

First processor 470 and second processor 480 may be coupled to a chipset 490 via P-P interfaces 452 and 454, respectively. As shown in FIG. 5, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 5, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a control stage to control execution of a first data path and a second data path of a processor;
    the first data path having a first register file and a plurality of first execution units coupled to the first register file; and
    the second data path having a second register file and at least one second execution unit coupled to the second register file, wherein the apparatus is to execute an instruction on a first portion of a vector operand in one of the first execution units of the first data path and to execute the instruction on a second portion of the vector operand in the at least one second execution unit of the second data path at least one cycle later than execution of the instruction in the first data path.

2. The apparatus of claim 1, wherein execution of the instruction in the second data path is controlled to be staggered from execution of the instruction in the first data path.

3. The apparatus of claim 1, further comprising a pipeline including the control stage and the first data path.

4. The apparatus of claim 1, further comprising a transmission channel coupled between the first data path and the second data path to store data from the second data path into the first data path and to load data into the second data path from the first data path.

5. The apparatus of claim 1, wherein the apparatus comprises a processor and the first data path comprises a scalar data path and the second data path comprises a vector data path.

6. The apparatus of claim 5, wherein the vector data path is a slave path of the scalar data path.

7. The apparatus of claim 5, wherein the vector data path is to remain in a power down state during scalar operations.

8. The apparatus of claim 1, wherein the plurality of first execution units comprises at least one memory execution unit to handle memory operations for the first data path and the second data path.

9. The apparatus of claim 1, wherein the control stage is to split a vector operation into a first operation portion and a second operation portion, and to control execution of the first operation portion on the first data path using a first operand portion and to stagger execution of the first operation portion on the second data path using a second operand portion.

10. The apparatus of claim 9, wherein the control stage is to stagger execution of the second operation portion after the first operation portion, and to control execution of the second operation portion on the first data path using a third operand portion and to stagger execution of the second operation portion on the second data path using a fourth operand portion, wherein the first operand portion, the second operand portion, the third operand portion and the fourth operand portion comprise a vector operand.

11. A method comprising:
executing an operation on low order portions of a first source operand and a second source operand using a first execution stack of a processor, the first execution stack including a first register file and at least one first execution unit; and
executing the operation on high order portions of the first source operand and the second source operand using a second execution stack of the processor, the second execution stack including a second register file and at least one second execution unit, the operation in the second execution stack staggered by one or more cycles from the operation in the first execution stack, wherein the low order portions are only operated on in the first execution stack and the high order portions are only operated on in the second execution stack.

12. The method of claim 11, further comprising controlling the second execution stack via a control stage of the first execution stack.

13. The method of claim 11, wherein the low order portions correspond to a data width of the first execution stack.

14. The method of claim 13, wherein the high order portions correspond to a data width of the second execution stack.

15. The method of claim 11, further comprising sending result data of the operation from the second execution stack to the first execution stack.

16. The method of claim 15, further comprising performing a memory operation on the result data via the first execution stack.

17. A system comprising:
a processor having a scalar pipeline including at least one control stage and a scalar data path having a first register bank and at least one first execution unit;
the processor further having a vector data path including a second register bank and at least one second execution unit, wherein the at least one control stage is to control execution of a vector instruction in the scalar pipeline and the vector data path such that the scalar data path is to execute the vector instruction on a first portion of source operands, and the vector data path is to execute the vector instruction on a second portion of the source operands, wherein execution of the vector instruction in the vector data path is staggered by at least one cycle from execution of the vector instruction in the scalar data path; and a dynamic random access memory (DRAM) coupled to the processor.

18. The system of claim 17, wherein the at least one first execution unit comprises a first single instruction multiple data (SIMD) unit and the at least one second execution unit comprises a second SIMD unit.

19. The system of claim 17, wherein the vector data path comprises a slave data path under control of the at least one control stage.

20. The system of claim 17, further comprising a storage in the scalar data path to store result data from the scalar pipeline and the vector data path prior to retirement.

21. An article comprising a machine-readable storage medium including instructions that if executed by a machine enable the machine to perform a method comprising:
providing a scalar operand to a main data path and duplicating the scalar operand into an auxiliary data path using a duplicate micro-operation to duplicate the scalar operand into a temporary storage of the auxiliary data path;
executing an operation in the main data path using the scalar operand and a first portion of a vector operand and storing first result data of the operation in the main data path; and
executing the operation in the auxiliary data path using the duplicated scalar operand and a second portion of the vector operand and storing second result data of the operation in the main data path, wherein execution of the operation in the auxiliary data path is staggered by at least one cycle from execution of the operation in the main data path.

22. The article of claim 21, wherein the method further comprises sending the second portion of the vector operand to the auxiliary data path, wherein the second portion comprises a high order portion of the vector operand.

23. The article of claim 21, wherein the method further comprises:
splitting a micro-operation for the operation into a first portion and a second portion;
first executing the first portion on the main data path and the auxiliary data path; and
second executing the second portion on the main data path and the auxiliary data path.

24. The article of claim 23, wherein the method further comprises:
first operating on the scalar operand and a low order part of the first portion of the vector operand, the low order part corresponding to a combined data width of the main data path and. the auxiliary data path, in the main data path and the auxiliary data path according to the first portion of the micro-operation; and
second operating on the scalar operand and a high order part of the first portion of the vector operand, the high order part corresponding to the combined data width, in the main data path and the auxiliary data path according to the second portion of the micro-operation.

* * * * *